July 12, 1938.  A. PARTIN  2,123,795

MILK CAN SEALER

Filed Nov. 23, 1936

Albert Partin  INVENTOR
BY Victor J. Evans & Co.
ATTORNEYS

Patented July 12, 1938

2,123,795

UNITED STATES PATENT OFFICE 2,123,795

MILK CAN SEALER

Albert Partin, Jardine, Mont.

Application November 23, 1936, Serial No. 112,401

1 Claim. (Cl. 220—24)

The invention relates to a milk can attachment and more especially to a milk can sealer.

The primary object of the invention is the provision of an attachment of this character, wherein the same can be applied to the top of the milk can such as those used for evaporated milk so that the openings in the top, one being an air vent and the other a pouring opening, can be closed and sealed to avoid leakage of the contents of the can should it be upset or turned over and also to assure sanitary conditions.

Another object of the invention is the provision of an attachment of this character, wherein the same can be applied to the can body with dispatch and will be firmly fastened in place so that the can can be sealed after the opening thereof for the dispensing of its contents.

A further object of the invention is the provision of an attachment of this character, which is extremely simple in construction, thoroughly reliable and effective in its operation, readily and easily applied to and removed from the can body, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing.

Similar reference characters indicate corresponding parts throughout the several views in the drawing.

Figure 1:
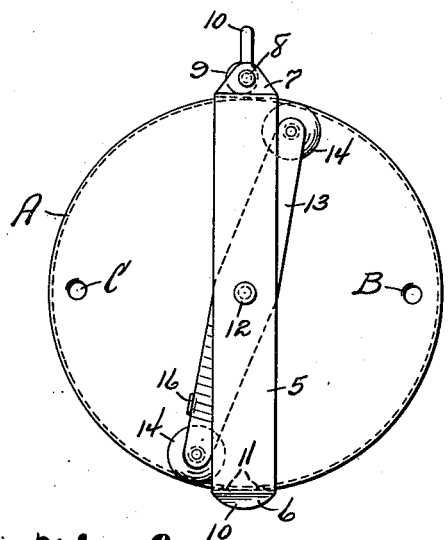
Figure 1 is a top plan view of a can showing the device constructed in accordance with the invention applied thereto but in non-sealing position.

Referring to the drawing in detail, A designates generally a milk can, preferably of the kind employed for containing evaporated milk or cream, and, as is customary, there is provided in the top an air vent B and a pouring opening C, respectively, these being punched or otherwise formed by disrupting the top of the body of the can and are preferably diametrically disposed with respect to each other.

The attachment or sealer constituting the present invention comprises a bail or yoke preferably of inverted substantially U-shape and is formed from a metal strap 5, one end or limb thereof constituting a latching jaw 6 while the other end or limb is provided with an out-turned bearing 7 to which is pivoted at 8 an eccentric 9 formed with a finger clip or lever 10 so that said eccentric can be manipulated to fasten the yoke in bridging relation and upon the body of the can. The end 6 constituting the latching jaw is formed with an outwardly curled finger nib 10 which enables the convenient application and removal of the yoke to and from the can. This end 6 has instruck spurs 11 for biting engagement with the side wall of the can when the yoke is applied thereto.

Figure 2:
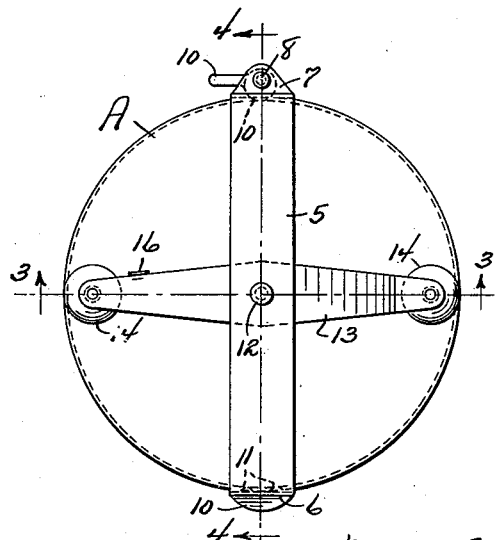
Figure 2 is a view similar to Figure 1 showing the attachment in sealing position.
Figure 3:
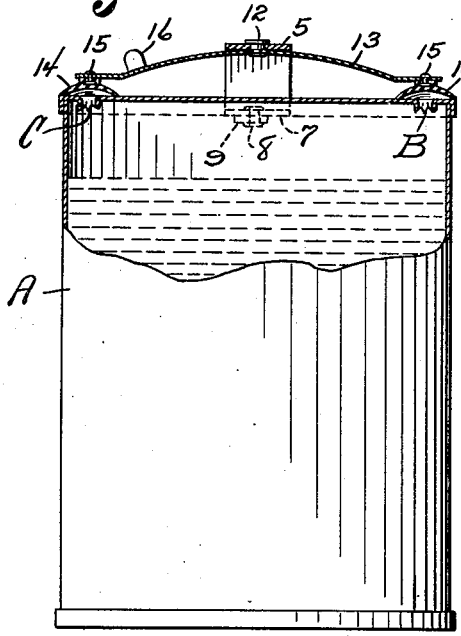
Figure 3 is a side elevation partly in section taken on the line 3—3 of Figure 2 looking in the direction of the arrows.
Figure 4:
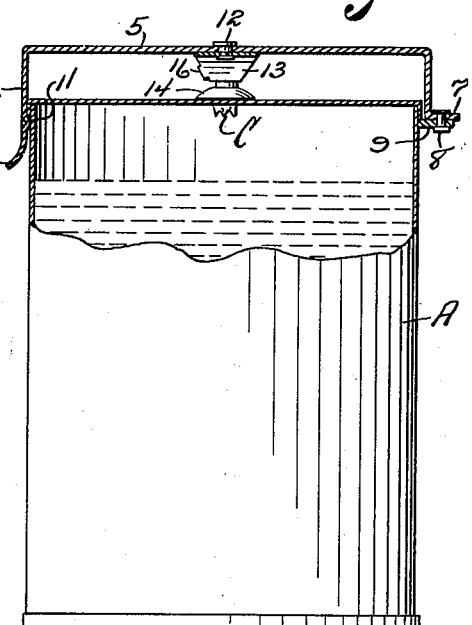
Figure 4 is a view similar to Figure 3 taken on the line 4—4 of Figure 1 looking in the direction of the arrows.

The yoke when applied to the can body has its intermediate portion between the ends 6 and 7 properly elevated from the top of the can and medially of this portion through the instrumentality of a pivot 12 has connected therewith an upwardly arched resilient bar 13 preferably reversely beveled in opposite directions and at the extremities thereof are vacuum cup-like elastic sealing members 14, these being made secure to the extremities of said bar 13 by rivets 15 or otherwise and such members are adapted to form closures for the vent B and pouring opening C when such bar is swung in position for superimposing the members 14 thereover. The inherent resiliency in the bar 13 urges the members 14 into sealing position or contact with the top of the can A, there being provided a finger piece 16 on the bar 13 at one longer edge thereof so that such bar can be conveniently turned into sealing position or to a non-sealing position, the latter being shown in Figure 1 of the drawing while in Figure 2 is illustrated the sealing position of the attachment.

By the end 6 which is the latching jaw and the eccentric 9 the yoke can be detachably secured to the can body with dispatch and when so secured will be firm and rigid without accidental releasement therefrom.

What is claimed is:

A sealing device for milk cans comprising an inverted substantially U-shaped bail for bridging one end of the can and having an out-turned lug on one limb thereof and also an outwardly curved terminal on the other limb of said bail, in-struck burs on said terminal for spaced engagement thereof with the side of the can, an eccentric pivoted to said lug for swing at right angles to the side of the can, a lever extension on said eccentric for actuation thereof to bring the same into engagement with the can, an upwardly arched resilient bar underlying the said bail, a pivot centrally connecting the bail and bar together for relative movements of the same with respect to each other, a finger piece up-turned from the bar and in the path of the bail, and inverted resilient cup-shaped sealing members beneath said bar and riveted to opposite ends thereof for coverage of openings diametrically opposite to each other in the end of the can next thereto.

ALBERT PARTIN.